United States Patent

[11] 3,579,044

| [72] | Inventor | Lawrence Phillips, Jr., 840 Inverness, Pasadena, Calif. 91103 |
| --- | --- | --- |
| [21] | Appl. No. | 876,465 |
| [22] | Filed | Nov. 13, 1969 |
| [45] | Patented | May 18, 1971 |

[54] UNIT SUBSTATION WITH TRANSFORMER AND CONTROL COMPARTMENTS
10 Claims, 6 Drawing Figs.

[52] U.S. Cl. ............................................. 317/103, 174/52, 317/120, 336/92
[51] Int. Cl. ............................................. H01f 27/06, H01f 27/04
[50] Field of Search ................................... 174/52, 317/103, 120; 336/59, 90, 92

[56] References Cited
UNITED STATES PATENTS

| 3,014,158 | 12/61 | Nelson | 174/52X |
| 3,259,808 | 7/66 | Gramlich | 317/120X |
| 3,496,420 | 2/70 | Leonard | 317/103 |

*Primary Examiner*—Laramie E. Askin
*Assistant Examiner*—Gerald P. Tolin
*Attorney*—Christie, Parker and Hale

ABSTRACT: A frame of the unit substation employs the upper and lower core clamping members of a transformer and a pair of spaced-apart transformer supporting members which support the transformer by carrying the lower clamping members. A barrier of insulating material is mounted within a housing through the bolts used to exert the clamping force of the core clamping members on the core of the transformer. Output terminals from the secondary side of the transformer are connected directly to corresponding horizontally disposed bus bars. The barrier mounts the bus bars and separates the interior of the housing into a transformer compartment and a controller compartment. The substation is constructed such that air can freely circulate through not only the transformer compartment but also the control compartment.

INVENTOR.
LAWRENCE PHILLIPS JR.

BY
Christie, Parker & Hale
ATTORNEYS

UNIT SUBSTATION WITH TRANSFORMER AND CONTROLLED COMPARTMENTS

BACKGROUND OF THE INVENTION

The present invention relates to a transformer unit substation employed for reducing voltage from a source of power to a predetermined lower value.

Unit substations are employed to reduce the voltage of a source of power to a level commensurate with the particular applications the unit substation serves and to control power to these applications. Control is effected through circuit breakers. A transformer is employed for the reduction of voltage. Normally three-phase current is supplied by the power source. Under normal circumstances, the transformer of a substation used for residential purposes supplies single phase power. The single phase output of a transformer consists of any two phases of the three-phase power supply. A unit substation has a primary side and a secondary side. The primary side is where the high voltage of the source of power feeds into the substation. The primary side includes the transformer. The secondary side is the control side of the substation and has circuit elements including circuit breakers for the low voltage from the secondary windings of the transformer. Unit substations employ a physical barrier between their primary side and their secondary side to prevent human exposure to the high voltage of the primary side.

There are several problems with existing unit substations. Some unit substations, for example, employ a metallic barrier which necessitates tortuous bus bar routing from the secondary side of their transformers to the circuit breakers in their control compartments. Another problem is in the installation of the prior art unit substations. Many of these substations have permanently installed structural members all around their bottoms. This necessitates the lifting of the substation for placement over a concrete pad from which outlet conductors emanate and on which the substation is to be installed. The conductors had to be brought into the interior of the substation before the substation could be lowered onto the pad. Another problem is in the lack of air circulation around the circuit breakers in the control compartment. Many circuit breakers are of the thermal-magnetic type and as a consequence, if the temperature within the control compartment becomes high enough, nuisance tripping of the breakers occurs.

SUMMARY OF THE INVENTION

The present invention provides a unit substation which is readily adapted to solve the problems outlined above.

In one form, the present invention contemplates a unit substation for producing a predetermined outlet voltage from a predetermined input voltage which has a housing for a transformer and outlet circuit breakers. A barrier of insulating material is affixed within the housing to separate its interior into a transformer compartment and a control compartment. The transformer is disposed in the transformer compartment and circuit breakers may be disposed in the control compartment. The barrier effects a physical division between the primary side and the secondary side of the substation. A bus bar for each phase of secondary current is mounted on the barrier on the control compartment side. Each bus bar is electrically connected to its appropriate secondary output terminal of the transformer. Conductor means for neutral is also mounted on the barrier. Preferably, bus bars are mounted horizontally on the barrier to allow neat and orderly wiring on the control compartment side of the substation. It is also preferred to have the connection between each bus bar and its associated secondary output terminal to be intermediate the ends of the bus bars in order to reduce their cross-sectional area.

The presently preferred embodiment of the present invention contemplates the use of the transformer's core clamping members and a pair of transformer support members as the frame for the unit substation. Specifically, a pair of fore and aft and spaced-apart transformer support members support the lower core clamping members while the upper core clamping members provide a frame for side walls or panels of the housing. With this construction, the front and back walls of the housing may be made removable in order that the unit substation can be slid over conductors emanating from the ground, instead of having the substation lifted above the conductors for its installation.

To avoid the problem of nuisance tripping of circuit breakers in the control compartment, it is preferred to have means for circulating air through the control compartment. This may be done by an opening in the front wall of the substation, openings into the control compartment for the passage of air around its circuit breakers, and an opening between the roof of the substation and the control compartment. Air circulation is also enhanced by having the barrier extend only down to the support members. This provides an air passage between the transformer compartment and the control compartment.

These and other features, aspects and advantages of the present invention will become more apparent from the following description, appended claims and drawings.

DESCRIPTION OF THE PREFERRED EMBODIMENTS

Figure 1:
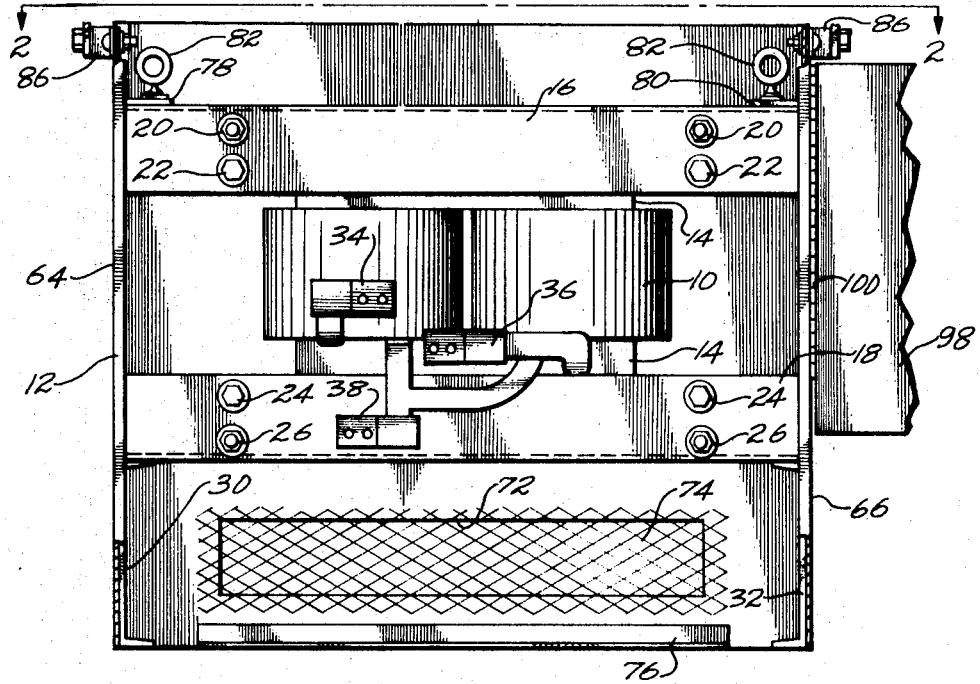
FIG. 1 is a partial, front elevational view of a preferred unit substation of the present invention.
Figure 2:
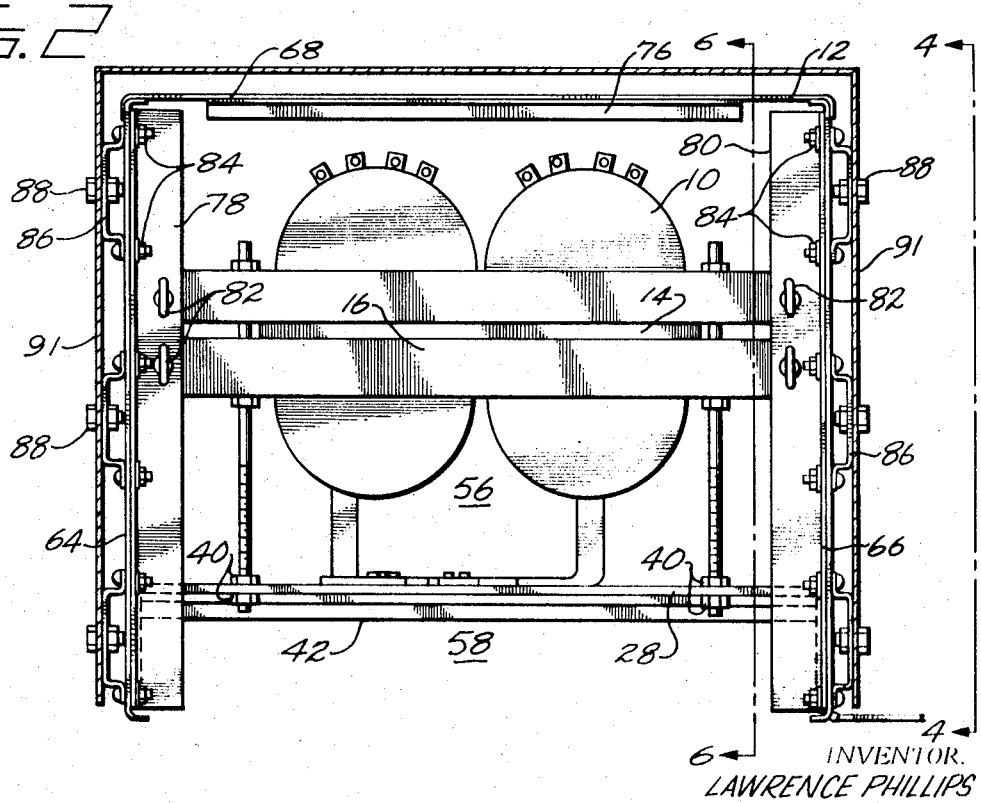
FIG. 2 is a top plan view of the FIG. 1 embodiment.
Figure 4:
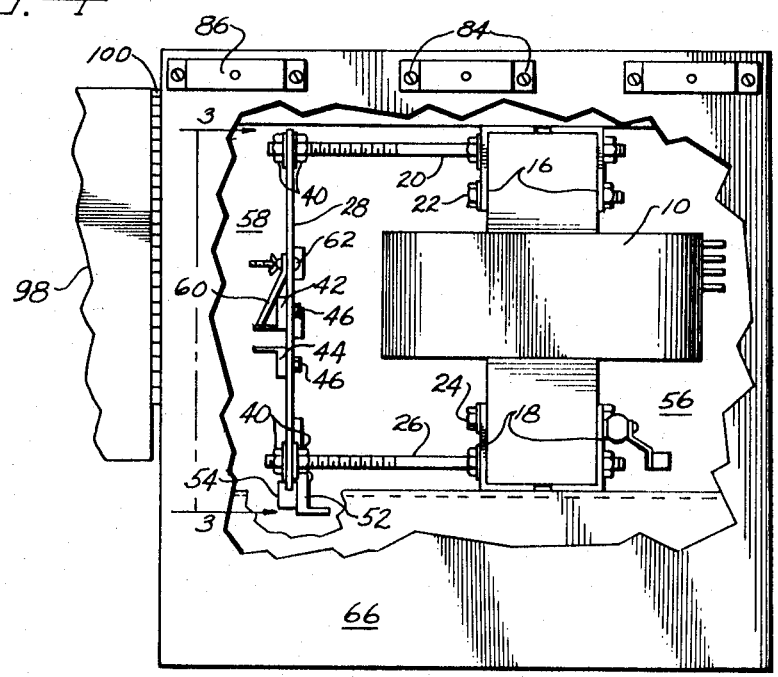
FIG. 4 is a side elevational view, partly broken away, of the unit substation of the present invention.

FIGS. 1, 2 and 4 illustrate a transformer 10 of standard construction disposed with a housing 12. The transformer has primary coils and secondary coils and a core 14. The core is clamped at its top and bottom by upper core clamping members 16 and lower core clamping members 18, respectively. As seen in FIG. 4, these clamping members are angles. The force of clamping is provided by clamping bolts 20 and 22 for the upper clamping members and clamping bolts 24 and 26 for the lower clamping members. Bolts 20 and 26 for the upper and lower clamping members extend forward of the transformer for the mounting of a barrier 28. A pair of fore and aft, spaced-apart transformer support channels 30 and 32 carry lower clamping members 18. These transformer supporting members extend for substantially the entire depth of the unit substation. Lower core clamping members 18 are spaced from the bottom of the unit substation by the height of the supporting members.

Commercially available transformers come with clamping members for their cores. The clamping members of the present invention, however, differ from prior art clamping members in that they are longer to develop a space within the housing to each side of the transformer for air circulation and to provide framing for the substation. Together, the upper and lower core clamping members and the transformer support channels constitute the supporting structure or frame of the unit substation of the present invention.

The transformer illustrated in the drawing has a pair of output phase terminals in the form of pads 34 and 36, and a neutral terminal in the form of a pad 38. The output phase and neutral terminals are electrically coupled to the secondary windings of the transformer in a manner well known in the art.

Figure 3:
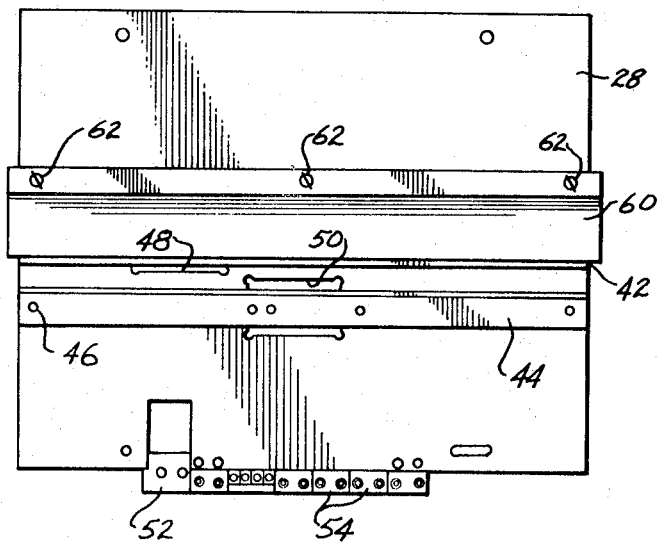
FIG. 3 is a front elevational view of the barrier of the present invention.

Barrier 28 is supported within the housing through upper and lower elongated bolts 20 and 26 which, as previously mentioned, also serve to clamp their associated core clamping members tightly against the core of the transformer. Mounting is effected through nuts 40 on each side of the barrier on the bolts. The barrier is fabricated from an insulating material such as phenolic. As a consequence, a bus bar 42 and a bus bar 44 for the output phase terminals of the transformer can be and are mounted on the barrier, as seen in FIGS. 3 and 4. Mounting is effected through fasteners 46. Cutouts in the circuit board provide for the electrical connection of the output phase terminal pads with their respective bus bars. These cutouts are shown by reference numerals 48 and 50 in FIG. 3. Neutral connection is provided by a bus bar 52 and a plurality of terminal blocks 54 at the bottom of the barrier, the terminal blocks and bus bar being carried by the barrier.

The barrier, as previously mentioned, is carried by upper and lower clamping bolts 20 and 26. The barrier constitutes a physical division between a transformer compartment 56 and a control compartment 58 of the unit substation. Bus bars 42 and 44 mounted on the barrier are insulated from each other through the barrier. A protective guard 60 of insulating material is also mounted on the barrier to partially mask bus bar 42 and prevent the inadvertent touching of the bus bar when, for example, circuit breakers are being changed. Guard 60 is secured to barrier 28 through fasteners 62 and extends outwardly and downwardly from its connection over the vertical flange of bus bar 42. As shown in FIG. 4, barrier 28 does not extend the full height of the unit substation. A space below the barrier, generally corresponding to the spacing between the tops of channels 30 and 32 and the bottom of the substation is present, and a space above the barrier is present. This provides for free circulation of air through both the transformer compartment and the control compartment of the unit substation.

The unit substation's housing 12 generally consists of a shell with a pair of side walls 64 and 66, a back wall 68 and a front wall 70. As seen in FIG. 1, the back wall has an opening 72 for the passage of air. An expanded metal screen 74 provides a guard over this opening. The screen is attached as by welding to the inside of the back wall. An angle 76 provides stiffening for the back wall. It is attached to the back wall, again as by welding. Side walls 64 and 66 extend substantially the entire height of the unit substation. Side walls 64 and 66 are secured as by fasteners to former support channels 30 and 32. The side walls are also fastened to upper transformer core clamping members 16 through angles 78 and 80. These angles are secured to the upper transformer core clamping members through lifting pad eyes 82. The side walls themselves are attached to the angles as by a series of fasteners 84, seen in FIG. 2.

Transformer capacity is normally reflected in the height of a transformer. Thus with a greater capacity transformer than the one shown, the upper core clamping members would be higher than the ones shown in FIG. 1. Conversely, for a transformer of a lower rating, the height of the transformer would be lower and the position of the upper transformer core clamping members would also be lower. This is shown specifically in FIG. 5. In any event, the securing of the side walls of the housing through angles 78 and 80 increases the flexibility of the housing shell to accommodate various rated transformers. If, for example, the transformer rating were very high, the angles could be reversed such that the flange of the angle connected to each of the side walls would extend below the flange of the angle which is connected through the pad eyes to the core clamping members, instead of above as illustrated. In most instances, however, angles 78 and 80 are replaced by similar angles having longer or shorter vertical walls to accommodate different transformer ratings. Thus, the fastener hole location in the side walls need not be changed.

As shown in FIG. 2, each side wall has a plurality of U-shaped brackets 86 for receipt of fasteners 88 to attach a roof 90 of the housing to the side walls. Fasteners 88 pass through downward depending walls 91 of the roof and the brackets. The attachment of the roof is such as to leave a space between the side walls, back wall and front wall, on the one hand, and the roof, on the other, for the passage of air from the interior of the housing.

Front wall 70 is in two sections. A first section 91 of the front wall is semipermanently affixed to the side walls as by sheet metal screws 92. This lower section has an opening 94 for the passage of cooling air into the interior of a housing. The opening is backed by an expanded metal screen 96 affixed to the interior of the section. The upper section of the front wall is a door 98 which is connected through a hinge 100 to side wall 66.

Figure 5:
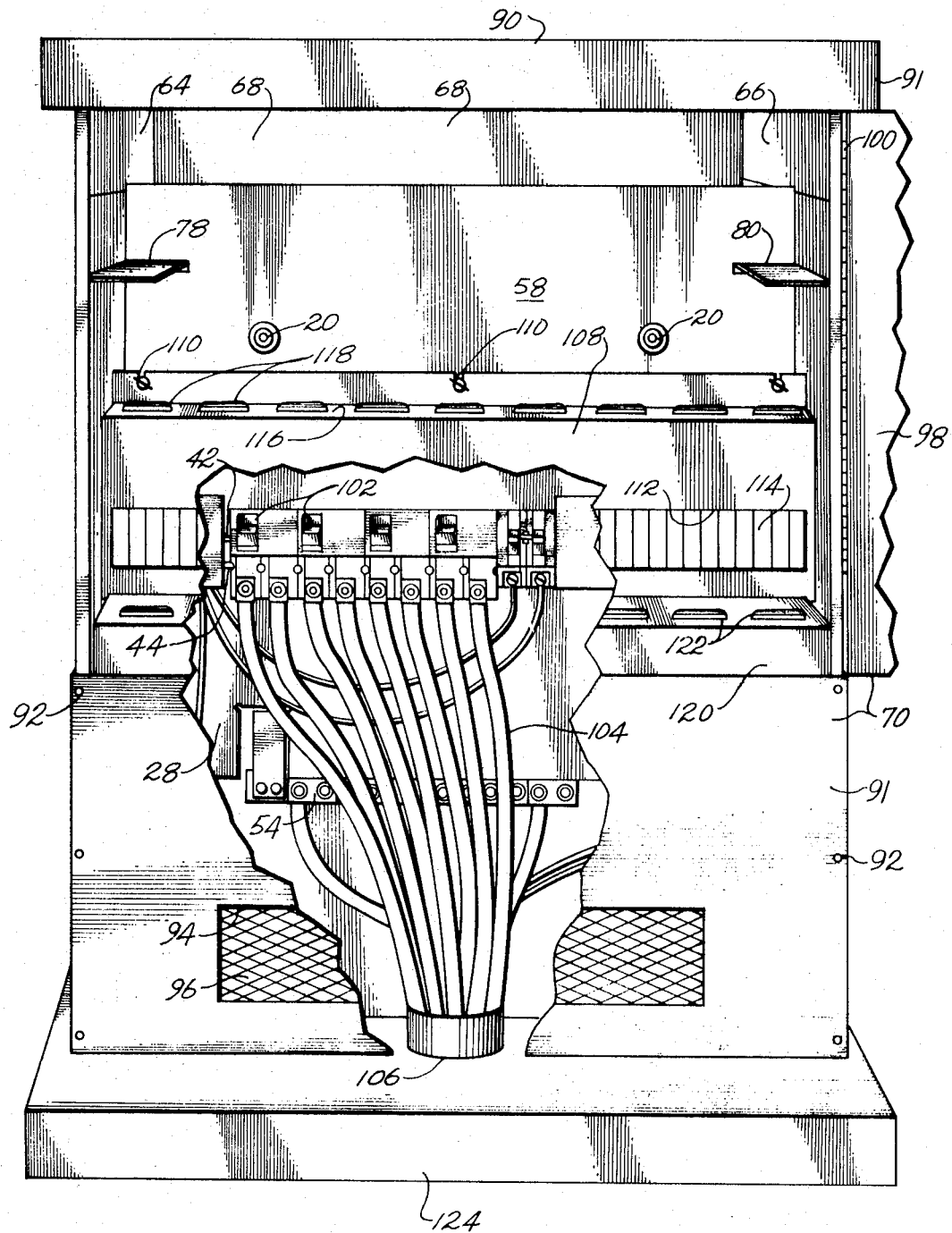
FIG. 5 is a front perspective view of the unit substation of the present invention partly broken away to show the wiring of the substation's circuit breakers.
Figure 6:
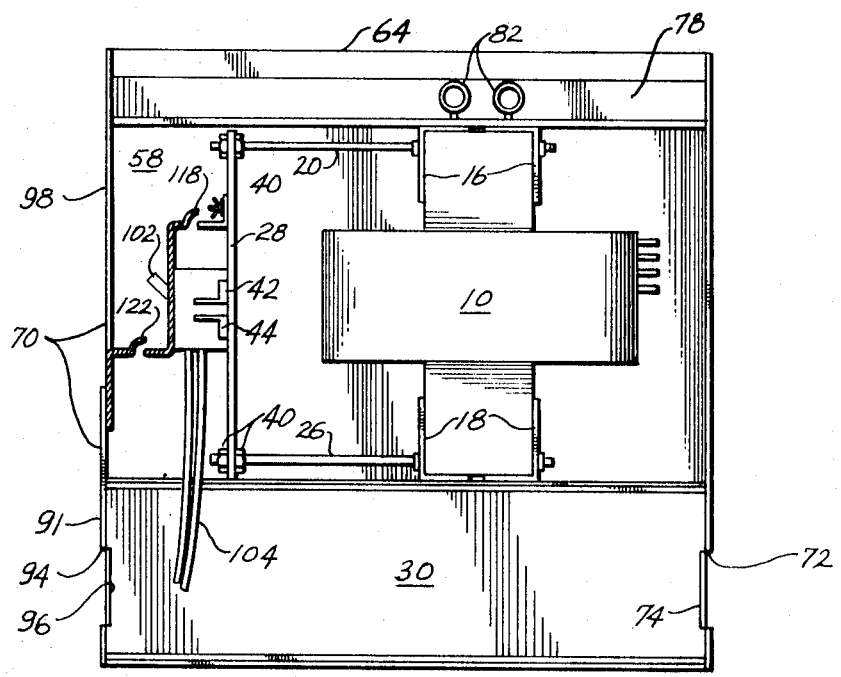
FIG. 6 is a side elevation in section of the substation of the present invention.

With specific reference to FIGS. 5 and 6, control compartment 58 of the unit substation is illustrated with greater specificality. The control compartment houses the circuit breakers for the outlet conductors of the unit substation. These circuit breakers are shown by reference numeral 102. The circuit breakers are on bus bars 42 and 44 and may be affixed to barrier 28. Conductors 104 from a ground conduit 106 are attached to the outlet terminals of the circuit breakers, these conductors constituting the outlet of the unit substation. The circuit breakers are covered by a dead front or cover 108, which is generally in the shape of an angle, affixed as by fasteners 110 to barrier 28. The switch elements of the circuit breakers extend through an opening 112 in this cover. Blank filler plates 114 are inserted in this opening where no circuit breakers are to be used. An upper horizontal wall 116 of the circuit breaker cover is louvered along its length for the passage of air past the circuit breakers and into the control compartment proper. The louvers are indicated by reference numeral 118. A compartment divider 120, again of generally angular shape, is affixed within the housing, as to side walls 64 and 66, to provide a guard between the control compartment proper and that area below the control compartment which houses exposed live circuit elements. This divider also has a plurality of louvers 122 for the free passage of air from the area below it, past the outside of the circuit breakers, and out of the housing. FIG. 5 also illustrates the connection of the outlet conductors to terminal blocks 54 of the neutral of the power supply.

In FIG. 5 it will be noted that angles 78 and 80 extend into cutouts in barrier 28. These cutouts may be provided without the loss of barrier quality of the barrier. This position of the angles is determined by the lower capacity of the transformer than the capacity of the transformer shown in FIG. 1 for the reasons previously discussed. The angles are again secured by lifting pad eyes 82 to the upper core clamping members of the transformer and to the side walls of the unit substation. As previously mentioned, roof 90 is positioned above the front, rear and side walls to permit air which has been heated within the unit substation to pass from the unit substation.

For the placement of the unit substation on a concrete pad 124 in its installation, one merely removes lower section 91 of front wall 70 and, if desired, rear wall 68. The structural integrity of the unit is preserved because integrity is provided through parallel transformer support channels 30 and 32 and core clamping members 16, 18. As is evident from FIG. 1, there is a considerable amount of space between the lower surface of core clamping members 18 and the bottom of the substation for the sliding of the unit substation over exposed conductors 194 emanating from under ground conduit 106. Thus, time consuming, expensive and unsatisfactory holding of a unit substation above the ground for placement over exposed conductors is avoided.

It should also be noted that the interior of the substation is open for air flow through openings 94 and 72 of front wall 70 and back wall 68, respectively. The space below lower core clamping members 18 provides for the flow of air into the transformer compartment and the control compartment from either the openings in the front or back walls of the unit substation. Air can also freely circulate past the circuit breakers by virtue of the louvers in cover 108 and in front of the circuit breakers by virtue of the louvers in divider 120. Air can also circulate around the ends of barrier 28 inasmuch as the barrier can be spaced from the side walls because the side walls are not required to carry the barrier. Thus air, by natural convection, can circulate and cool all of the electrical components within the unit substation.

I claim:

1. A unit substation for producing a predetermined output voltage from a predetermined input voltage comprising:
    (a) a housing;
    (b) a barrier fabricated of insulating material affixed within the housing to separate its interior into a transformer compartment and a control compartment, the barrier providing a physical barrier between a primary side and a secondary side of the substation;
    (c) a transformer within the transformer compartment, the transformer having a secondary output terminal and a neutral terminal;
    (d) a bus bar for supplying current to a plurality of circuit breakers on the bus bar, the bus bar being mounted on the barrier in the control compartment and being electrically connected to the secondary output terminal; and
    (e) conductor means mounted on the barrier in the control compartment electrically connected to the neutral terminal.

2. The unit substation claimed in claim 1 wherein: a pair of spaced-apart and parallel transformer support members is provided, the transformer being carried by the support members a predetermined distance above the bottom of the unit substation, the unit substation being capable of being slid on the support members over conductors emanating from the ground with such conductors being between the support members.

3. The unit substation claimed in claim 2 wherein the housing has a pair of side walls with one of the side walls being secured to one of the support members and the second side wall being secured to the second support member, a front wall, and a back wall, at least a portion of the front and back walls being removable for the sliding of the unit substation over conductors emanating from the ground.

4. The unit substation claimed in claim 2 wherein the housing has a pair of side walls with one of the side walls being secured to one of the support members along the length thereof and the second side wall being secured to the second support member along the length thereof, a back wall, and a front wall bounding the control compartment, the front wall having an upper door portion for access to the control compartment and a lower removable portion for the sliding of the unit substation over conductors emanating from the ground.

5. The unit substation claimed in claim 2 including:
    (a) a pair of upper core clamping members clamping the upper portion of the transformer core together, the upper core clamping members extending a predetermined distance to each side of the transformer; and
    (b) a pair of lower core clamping members clamping the lower portion of the transformer core together, the lower core clamping members extending a predetermined distance to each side of the transformer and being supported by the transformer support members.

6. The unit substation claimed in claim 5 wherein the barrier is secured within the housing through upper and lower pairs of bolts, the upper and lower pairs of the bolts also providing the clamping force for the upper and lower core clamping members, respectively.

7. The unit substation claimed in claim 5 wherein the housing has a pair of side walls, and an angle for each side wall, one of the side walls being secured to one of the transformer support members along the length thereof and to the upper core clamping members through its associated angle, the second side wall being secured to the other transformer support member along the length thereof and to the upper core clamping member through its associated angle, the angles being removably secured to their associated side walls and the upper core clamping members.

8. The unit substation claimed in claim 7 wherein:
    (a) the housing has a front and a back wall, the front and back walls having openings in the lower portions thereof for the introduction of cooling air into the transformer and control compartments, the front wall bounding the control compartment and being removable for the sliding of the unit substation over conductors emanating from the ground;
    (b) a cover is provided for the bus bar, the cover being secured to the barrier and having an opening therein for access to the switching elements of circuit breakers on the bus bar;
    (c) a horizontal divider is provided in the housing, the horizontal divider defining a lower boundary of the control compartment, and being spaced above the opening in the front wall and below the opening in the cover;
    (d) a space between a roof of the housing and the transformer and control compartments is provided for air to pass from these compartments; and
    (e) openings in the horizontal divider and the cover above and below the bus bar, respectively, are provided for the passing of cooling air into the control compartment.

9. The unit substation claimed in claim 5 wherein the bus bar is horizontally disposed and the output terminal is connected to the bus bar medially thereof.

10. The unit substation claimed in claim 9 wherein the output and neutral terminals are defined by separate output and neutral vertical pads lying in a common vertical plane against the barrier, the bus bar and the neutral conductor means being secured to the output and neutral pads, respectively.